United States Patent
Jones et al.

(10) Patent No.: US 6,488,583 B1
(45) Date of Patent: Dec. 3, 2002

(54) GAME PLAYING WITH INDIVIDUAL ANONYMOUS LASER POINTERS

(75) Inventors: Thouis R. Jones, Cambridge, MA (US); Ronald N. Perry, Cambridge, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 0 days.

(21) Appl. No.: 09/541,239

(22) Filed: Apr. 3, 2000

(51) Int. Cl.[7] .................................................. A63F 13/00
(52) U.S. Cl. ............................. 463/34; 273/459; 463/51
(58) Field of Search ............................ 463/1, 30, 31, 463/34, 49, 50, 51, 52, 53, 54, 55, 56, 57; 273/238, 459, 460, 454; 372/109; 345/418, 619

(56) References Cited

U.S. PATENT DOCUMENTS

| | | | |
|---|---|---|---|
| 4,799,687 A | * 1/1989 | Davis et al. | 273/358 |
| 5,090,789 A | 2/1992 | Crabtree | 359/10 |
| 5,145,182 A | 9/1992 | Swift et al. | 273/238 |
| 5,191,411 A | * 3/1993 | Muckerheide | 358/93 |
| 5,366,229 A | * 11/1994 | Suzuki | 273/310 |
| 5,453,758 A | 9/1995 | Sato | 345/158 |
| 5,793,361 A | 8/1998 | Kahn et al. | 345/179 |
| 6,220,965 B1 | * 4/2001 | Hanna et al. | 463/52 |

* cited by examiner

*Primary Examiner*—Michael O'Neill
*Assistant Examiner*—Julie Brocketti
(74) *Attorney, Agent, or Firm*—Dirk Brinkman

(57) ABSTRACT

An image processing system enables the manipulation of individual anonymous laser pointers in interactive visual games. The system includes a display system that displays an image on a display screen. A camera acquires a sequence of images of the display screen. Participants in the game aim individual laser pointers at the screen; the laser pointers form dots on the display screen. A warp module corrects the acquired images for distortion. A registration module registers the corrected sequence of images with the displayed image, and modifies the displayed image in response to a distribution of the laser dots on the display screen.

8 Claims, 1 Drawing Sheet

GAME PLAYING WITH INDIVIDUAL ANONYMOUS LASER POINTERS

FIELD OF THE INVENTION

This invention relates generally to game playing, and more particularly, to interactive visual games with anonymous laser pointers.

BACKGROUND OF THE INVENTION

Pointing is one of the simplest ways for a person to indicate his wishes or to convey information to others. Pointing to a projected image is one of the most common aids to conversation, instruction, and cooperative effort. Pointing devices include fingers, pointing sticks, and other mechanical and illuminated instruments, light pens, touch pads, computer mice, touchscreens, and other electromechanical and electronic pointers.

Pointing may be direct pointing along a line of sight to a target, for example, when a pointing device is directly aimed at a portion of display of a radiated or otherwise projected image, or indirect pointing, as when a mouse is manipulated to control the position of an image of a pointer on a display, without pointing the mouse itself at the display. When the pointing is directed to a place on an object which is being shown on an electronic display, e.g., to a displayed icon, the act of pointing must be linked by some sort of electronic processing to the target icon.

Self-contained, hand held laser pointers which generate laser beams for use as a pointer are well known in the art and widely used in numerous applications. Typically, a hand held pointer is designed to look like a writing pen or key chain, see U.S. Pat. No. 5,121,188. Self-contained laser beam generators of this type are produced in substantial quantities to meet a well established demand for hand held pointer applications such as fishing, golfing, bowling, leveling, and pool.

U.S. Pat. No. 5,793,361 describes a pointer interface for natural human interaction with a display-based system. The system includes detectors to determine selection of particular displayed images by laser pointers.

U.S. Pat. No. 5,453,758 describes a car racing game where a car and a steering wheel are displayed, and the movement of the car is controlled by a laser pointer.

U.S. Pat. No. 5,145,182 describes a board game, which utilizes lasers. Players selectively divert the path of laser beams. The board apparatus includes an enclosed chamber with X-shaped pieces to deflect an incident laser beam from a row or column to a corresponding column or row. A scoring module, sensitive to incident laser light, is positioned in the chamber in front of each player. The players alternate in placing deflecting pieces in the chamber with the object to either direct their laser beams toward the opponent's scoring module or to prevent their opponent's laser beams from reaching their own scoring module.

Most prior art laser games, or for that matter, laser pointer applications, are for individual identified users. It is desired to provide a game where a large number of anonymous players can use laser pointers in cooperative or competitive game playing.

SUMMARY OF THE INVENTION

The invention provides an image processing system that enables the manipulation of individual anonymous laser pointers in interactive visual games. The system includes a display system that displays a stored or generated image on a display screen. A camera acquires a sequence of images of the display screen.

Participants in the game aim individual laser pointers at the display screen. The laser pointers project dots on the screen. A warp module corrects the acquired sequence of images for camera distortion. A registration module registers the corrected sequence of images with the stored image, and modifies the displayed image in response to a distribution of the laser dots on the display screen. The system can be used for shape forming games, as well as for games that move objects around on the screen according to the distribution of the laser dots.

As a unique feature of the invention, unlike traditional laser pointer games, the present invention makes no association between an individual laser dot on the display and the particular laser pointer that generates the dot. In a typical game, hundreds or thousands of players can simultaneously aim their laser pointers. What the invention is concerned with is the overall distribution of all of the pointers, and not the aiming of any one particular laser. In that sense, the playing is essentially anonymous, unlike prior art laser games, where the exact aiming point of a single laser is of prime concern.

DETAILED DESCRIPTION OF THE PREFERRED EMBODIMENT

Figure 1:
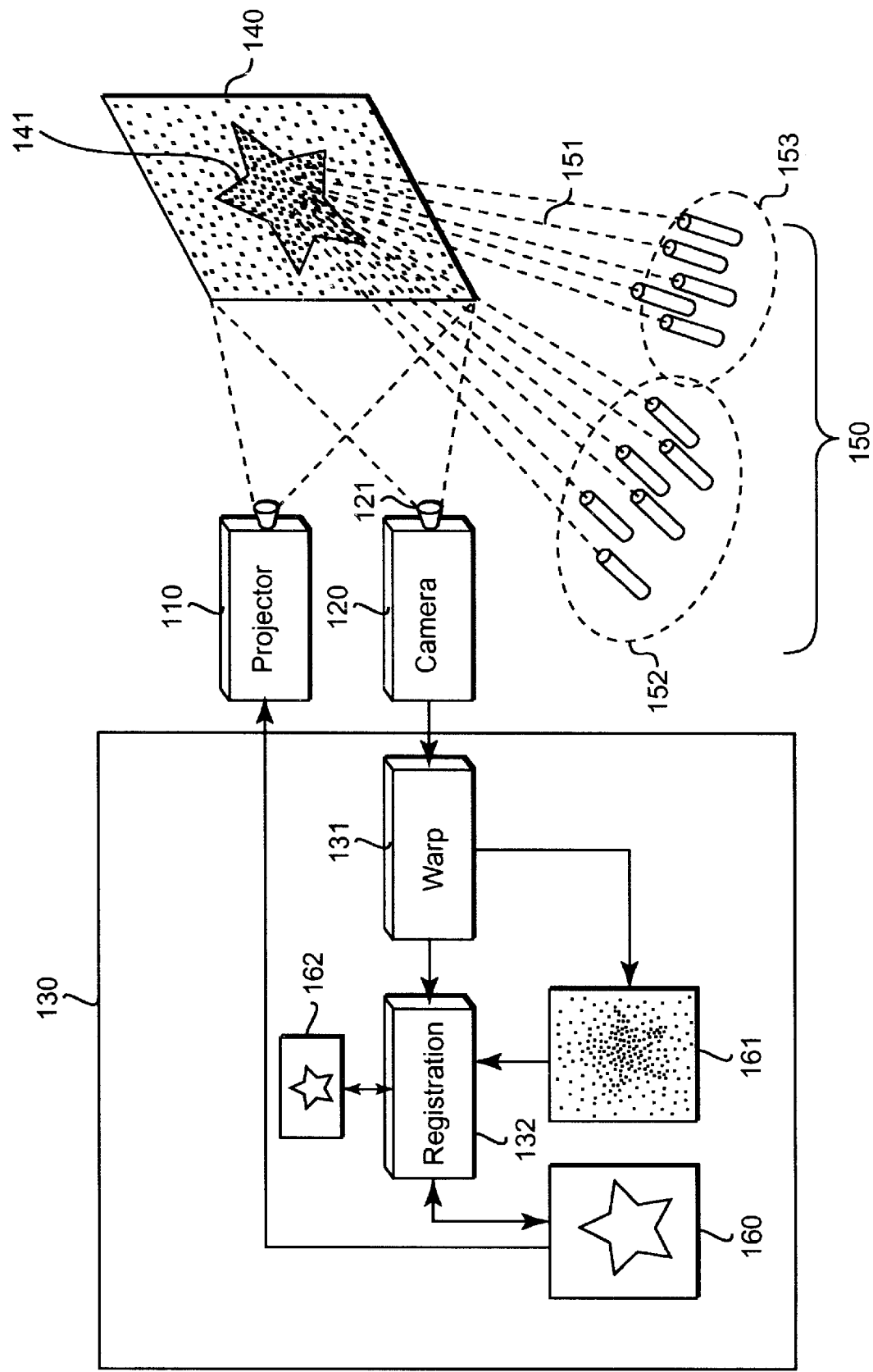
FIG. 1 is a block diagram of an interactive visual game system according to the invention.

FIG. 1 shows a system 100 for cooperative manipulation of individual lasers according to the invention. The system includes a display system, for example, a projector 110, a digital camera 120, an image processing system 130, a display screen 140, and a large number of individual laser pointers 150 individually manipulated by users of the system 100. The number of "players" in a "game" may number in the hundreds or thousands.

The laser pointers have limited power, for example, less than 5 milliwatts. The camera 120 is equipped with a filter 121 tuned to the same wavelength as the light 151 emitted by the laser pointers. The image processing system includes an image 160. The image can be pre-stored or generated. The image processing system also includes a warp module 131 and an image registration module 132.

During operation, the display system displays the image 160 on the screen 140. The users aim the laser pointers at the general area of the displayed image 141 to project laser dots. The camera 120 continuously acquires images of the screen, for example, at a rate of thirty or sixty frames per second. It should be noted that because the number of players may be very large, it is not possible for any individual player to identify their dot among the many other dots. Therefore, playing is essentially anonymous.

If necessary, the acquired images, which only show the individual laser dots, are corrected for distortion by the warp module 131. This is done where the optical axes of the display system and camera are not aligned, or in the case where the aspect ratio of the displayed image is different than the aspect ratio of the acquired images.

The corrected images 161 are stored by the image processing system. The corrected images 161 are registered with the image 160 to form a shared scene 162. The shared scene is updated in real-time to reflect the current locations of the laser dots in the shared scene. The registration module can then update the stored image in response to the distribution of the laser dots of the display screen. Thus, the system "awards" the players according to how the laser pointers are collectively aimed.

A number of different games are possible. The games can either require the individual users to achieve some shared goal. That is, if the objective of the shared goal is met, then all of the players are rewarded for their collaborative effort. Alternatively, the users can be partitioned into groups of two or more competing "teams" 152–153. In this case, only the group of players that best collaborates is rewarded. For example, in a shape drawing game, the object is to "draw" a shape with the laser pointers. The desired shape is the prestored image 160. As individual laser dots conform to the desired shape, the users are "rewarded" by having the system fill in the projected shape according to the distribution of the laser dots.

In other games, the shape is self-forming. Individual users make some arbitrary pattern on the screen, the system matches the pattern of the dots with stored geometrical patterns, such as circles, triangles, squares, stars, etc. As the laser dots coalesce to form some known pattern, the users are rewarded by displaying the "guessed" image.

In another game, the users, as teams, try to "push" a displayed object, e.g., a ball, towards a "goal." Here, the relative laser dot density on one side of the ball or the other, determines the direction that the object will travel. The team that scores first or more often is rewarded. Another game that can be played is a memory game. Here, the system displays the backsides of a large number of tiles. The front sides of the tiles have images that come in pairs. The front sides of the tiles are revealed, one at a time, by selecting a particular tile with the laser pointers. Tiles are only revealed if a larger number of laser pointers are aimed at the tile. Selecting two matching tiles in a row removes the pair of tiles from the game or causes the score to be updated.

It should be apparent, that a large number of games are possible. Games can be "self-emerging." For example, the system can simulate the flow of water over a surface whose shape is controlled by the laser pointers. In another game, multicolored blocks are displayed, and the users manipulate the blocks into structures.

As a feature of the present invention, unlike prior art laser games where correct aiming of an individual laser is generally rewarded, here, the collaborative aiming of anonymously aimed laser pointers is a major objective. In addition, the system as described never identifies or has to identify individual players with their pointer or projected dots.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A system for manipulating a plurality of individual laser pointers, comprising:
   a display system configured to project an image on a display screen;
   a plurality of individually manipulated laser pointers, the plurality of laser pointers to display simultaneously a plurality of laser dots on the display screen;
   a camera configured to acquire a sequence of images of the display screen and the simultaneously displayed plurality of laser dots; and
   a registration module configured to register the sequence of images with the displayed image, and to modify the displayed image according to a distribution of the simultaneously displayed laser dots on the display screen.

2. The system of claim 1 further comprising:
   a warp module configured to correct distortion in the acquired sequence of images.

3. The system of claim 1 wherein collaborative aiming of all of the laser pointers at the displayed image is rewarded.

4. The system of claim 1 wherein competitive aiming of a plurality of groups of laser pointers at the display screen is rewarded.

5. The system of claim 1 wherein the camera includes a filter tuned to a wavelength of the laser pointer to eliminate the displayed image from the acquired images of the display screen.

6. The system of claim 1 wherein individual pointers are not identified with their associated dots so that the manipulating of the laser pointers is anonymous.

7. A method for manipulating a plurality of individual laser pointers, comprising the steps of:
   displaying an image on a display screen;
   aiming a plurality of individually manipulated laser pointers at the display screen to display a plurality of laser dots on the display screen;
   acquiring a sequence of images of the display screen and the plurality of laser dots;
   registering the sequence of images with the displayed image; and modifying the displayed image according to a distribution of the plurality of laser dots on the display screen.

8. A method for manipulating a plurality of individual laser pointers, comprising the steps of:
   displaying a single image on a display screen;
   simultaneously aiming a plurality of individually manipulated laser pointers at the display screen to display a plurality of laser dots on the display screen;
   acquiring a sequence of images of the display screen and the plurality of laser dots;
   registering the sequence of images with the single displayed image; and
   modifying the single displayed image according to a distribution of all of the plurality of laser dots on the display screen.

\* \* \* \* \*